United States Patent [19]

Nakanishi

[11] Patent Number: 4,578,117
[45] Date of Patent: Mar. 25, 1986

[54] ERASABLE INK COMPOSITION
[75] Inventor: Mikihiko Nakanishi, Osaka, Japan
[73] Assignee: Sakura Color Products Corp., Osaka, Japan
[21] Appl. No.: 623,762
[22] Filed: Jun. 20, 1984
[30] Foreign Application Priority Data
    Jun. 22, 1983 [JP] Japan ................. 58-113029
[51] Int. Cl.$^4$ ............................. C09D 11/00
[52] U.S. Cl. ..................... 106/20; 106/27; 106/28
[58] Field of Search ................. 106/20, 27, 28
[56] References Cited
    U.S. PATENT DOCUMENTS
    3,582,327  6/1971  Boyd et al. ............... 430/291
    4,256,494  3/1981  Yamamoto et al. .......... 106/23
    FOREIGN PATENT DOCUMENTS
    57-028177  2/1982  Japan .

Primary Examiner—Paul Lieberman
Assistant Examiner—Willie J. Thompson
Attorney, Agent, or Firm—Wenderoth, Lind & Ponack

EXEMPLARY CLAIM

1. An erasable ink composition for writing on an impervious writing surface to form thereon a writing or marking which is erasable by wiping the surface; the composition comprising:
   about 40–90% by weight of a volatile organic solvent;
   about 1–20% by weight of a colorant;
   about 0.5–30% by weight of a resin which is soluble in the organic solvent; and
   about 1–25% by weight of a fatty acid ester of trimethylolalkane of the general formula

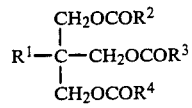

wherein $R^1$ represents an alkyl of 1–3 carbons, $R^2$ and $R^3$ represent independently hydrogen or an alkyl of 1–21 carbons, and $R^4$ represents an alkyl of 3–21 carbons.

11 Claims, No Drawings

ERASABLE INK COMPOSITION

The present invention relates to an erasable ink composition for writing on an impervious writing surface to form thereon a writing or marking which is readily erasable by wiping with a blackboard eraser, or with cloth or paper even after the writing is left standing over a long period of time.

An erasable ink composition is already known, as is disclosed in U.S. Pat. No. 4,256,494, for example. The ink composition is applied with a marking pen onto an impervious white or colored writing surface made of synthetic resin, metal, glass or enamel for instance, generally known as a white board, and forms thereon a writing or marking which is erasable by wiping with the usual blackboard eraser, or with cloth or paper, or the like. The erasable ink composition usually includes a volatile organic solvent, a colorant soluble or dispersable in the solvent, a resin, and a separating agent which is a non-volatile or only slightly volatile organic liquid or semi-solid and is soluble in the solvent at the normal temperatures so as to dry quickly on the impervious writing surface, but also to provide a writing which is readily erasable or separable therefrom.

Various separating agents are already known in the art, such as higher fatty acid esters, phthalic acid diesters, glycols, glycerine, aliphatic higher alcohols, liquid paraffin, and mixtures of two or more of these. The resin used is so selected as to be soluble in a mixture of the solvent and the separating agent, but is insoluble or only slightly soluble in the separating agent.

Therefore, when the ink composition is applied on the impervious writing surface followed by the evaporation of the solvent therefrom to form a writing or marking on the surface, the separating agent forms a thin liquid or semisolid film on the surface while most of the colorant and the resin remain on the film. Therefore, the writing or marking is readily removed or erased from the surface by wiping or light mechanical abrasion with an eraser, or with cloth or paper, or the like.

The prior erasable ink composition which includes the separating agent as aforesaid forms a writing which is readily erasable when wiped immediately after the application of the ink composition on the writing surface. However, when the writing is left standing over a long period of time, for example, about one month, the writing tends to stick onto the surface firmly so that the writing leaves perceptible stains on the surface even after being intensely wiped.

It is, therefore, an object of the present invention to obviate the disadvantages involved in the prior art, and to provide an improved erasable ink composition for writing on an impervious writing surface to form a writing or marking thereon which is readily erasable by wiping even after a long standing of the writing.

Other objects and features of the invention will be apparent from the following description thereof.

The erasable ink composition for writing on an impervious writing surface to form thereon a writing or marking which is erasable by wiping the surface; the composition comprising:
about 40–90% by weight of a a volatile organic solvent;
about 1–20% by weight of a colorant;
about 0.5–30% by weight of a resin which is soluble in the organic solvent; and
about 1–25% by weight of a fatty acid ester of trimethylolalkane of the general formula

wherein $R^1$ represents an alkyl of 1–3 carbons, $R^2$ and $R^3$ represent independently hydrogen or an alkyl of 1–21 carbons, and $R^4$ represents an alkyl of 3–21 carbons.

The volatile organic solvent used in the invention includes any one which has been heretofore used for producing a conventional ink composition for a marking pen, and is not specifically limited. However, the preferred organic solvent used is, for example, alkyl ketones such as methyl ethyl ketone and methyl isobutyl ketone, alicyclic ketones such as cyclohexanone, aliphatic alcohol esters of lower fatty acids such as ethyl acetate, butyl acetate, amyl acetate and butyl propionate, aromatic hydrocarbons such as benzene, toluene and xylene, alicyclic hydrocarbons such as cyclohexane and methylcyclohexane, aliphatic alcohols such as methanol, ethanol, propanol and butanol, alicyclic alcohols such as cyclohexanol, glycol monoalkylethers such as ethyleneglycol monomethylether, ethyleneglycol monoethylether, ethyleneglycol monopropylether and ethyleneglycol monobutylether, and mixtures of two or more of these.

The solvent is usually contained in the ink composition in amounts of about 40–90% by weight, preferably about 60–85% by weight, based on the ink composition so that the ink composition has a viscosity suitable for writing with a marking pen.

The colorant used in the invention is preferably an oil-soluble or spirit-soluble dye which is also soluble in the organic solvent used in the ink composition. However, a pigment may also be used as a colorant in the invention as long as it is composed of very fine particles and is uniformly dispersable in the ink composition. For example, carbon black is one of the pigments preferably used as a colorant in the ink composition of the invention. Furthermore, a resin-processed pigment such as Fuji IK Blue 2B (Fuji Shikiso K.K.), Euvi Print Black X-60 (trademark, BASF) or Michrolith Black C-A (trademark, Ciba-Geigy) may be preferably used as a colorant in the invention, since it usually contains resins in an amount of 10–50% by weight based on the pigment, as is well known in the art, and the pigment is readily and uniformly dispersable in the organic solvent without the addition of a resin as a disperser to the ink composition.

The content of the colorant in the ink composition of the invention varies depending upon the colorant used and the shade of the writing required on the writing surface, but the content of the colorant is usually about 1–20% by weight, preferably about 3–15% by weight, based on the ink composition. Too large a content of colorant makes the ink composition less stable and the viscosity of the composition excessively high, and may cause precipitation of the colorant, thus making smooth writing with a marking pen difficult. On the other hand, the ink composition containing too small a content of colorant forms a writing with an insufficient degree of shade on the writing surface.

The ink composition of the invention includes a resin which is soluble in the organic solvent used so that the ink composition has a viscosity suitable for writing with a marking pen and an adhesiveness onto the writing surface when being applied thereonto, but also to form a clear writing composed of a resin coating. Therefore, the resin is contained in the ink composition in amounts of about 0.5-30% by weight, preferably about 1-20% by weight, based on the ink composition. The resin also serves as a solubilizer for a dye but also as a dispersant in the case where a pigment is used as a colorant. However, a resin may not be incorporated into the ink composition when a resin-processed pigment as referred to hereinbefore is used as a colorant.

Any resin may be used in the invention as long as it is soluble in the organic solvent used. Some examples of the resin are natural resins such as rosin, processed rosins such as a rosin ester and a hydrogenated rosin, and rosin-modified resins such as a rosin-modified maleic acid resin and a rosin-modified phenol resin. Other examples are synthetic resins such as a phenol resin, a cellulose resin such as ethylcellulose or acetylcellulose, and a petroleum resin, a ketone resin, a polyvinylbutyral, a vinyl chloride-vinyl acetate copolymer, a vinylidene chloride-acrylonitrile copolymer and a vinylidene chloride-vinyl chloride copolymer.

According to the invention, a fatty acid ester of trimethylolalkane is contained in the ink composition as a novel separating agent. The ester has the general formula $$\begin{array}{c} CH_2OCOR^2 \\ | \\ R^1-C-CH_2OCOR^3 \\ | \\ CH_2OCOR^4 \end{array}$$

wherein $R^1$ represents an alkyl of 1-3 carbons, $R^2$ and $R^3$ represent independently hydrogen or an alkyl of 1-21 carbons, and $R^4$ represents an alkyl of 3-21 carbons.

The trimethylolalkane in the ester is any one of trimethylolethane, trimethylolpropane and trimethylolbutane. Trimethylolpropane is most preferably used on account of its ready availability. The fatty acid ester of the trimethylolalkane may be a mono-, di- or triester, and further may be a simple ester or a mixed ester where the ester is a di- or a triester. The fatty acid in the ester may be butyric acid, caproic acid, caprylic acid, capric acid, lauric acid, myristic acid, palmitic acid, stearic acid, behenic acid or oleic acid, but is not limited to these examples.

Some of these trimethylolalkane fatty acid esters are readily available in the market, among which are, for example, trimethylolpropane laurate stearate triester sold under the name of Unister H334R, trimethylolpropane tricaprate sold under the name of Unister H310, trimethylolpropane trilaurate sold under the name of Unister H312R, all by Nippon Yushi K.K., and trimethylolpropane tricaprylate sold under the name of NJLUB TPO by Shin-Nihon Rika K.K.

The fatty acid ester of trimethylolalkane is contained in the erasable ink composition of the invention in an amount of about 1-25% by weight, preferably about 3-15% by weight, based on the ink composition. When the ink composition contains the ester at more than about 25% by weight based on the ink composition, the composition is too viscous thus making smooth writing difficult, while the ink composition contains the ester less than about 1% by weight, the composition forms a writing lacking in erasability on the writing surface.

The erasable ink composition of the invention may further contain a separating agent already known in the prior art as an auxiliary separating agent. The auxiliary separating agent may be any one of those which are described hereinbefore. However, the erasable ink composition preferably includes, in particular, according to the invention at least one auxiliary separating agent which is selected from the group consisting of (a) a higher fatty acid ester of the general formula $$R^5COOR^6 \qquad (II)$$

wherein $R^5$ represents an alkyl of 7-21 carbons and $R^6$ represents an alkyl of 1-18 carbons, and (b) an aliphatic dibasic acid diester of the the general formula $$R^7OCO(CH_2)_nCOOR^8 \qquad (III)$$

wherein $R^7$ and $R^8$ represent independently an alkyl of 1-21 carbons, and n is 4-12.

Some preferred examples of the higher fatty acid ester are n-butyl caprylate, isopropyl caprate, n-butyl laurate, isopropyl myristate, isopropyl palmitate and n-butyl stearate, and some preferred examples of the aliphatic dibasic acid diester are dibutyl adipate, dioctyl adipate, didecyl adipate, decyl isooctyl adipate, diethyl pimelate, dibutyl sebacate and dioctyl sebacate.

The auxiliary separating agent may be contained in the ink composition in amounts of up to about 12% by weight, preferably about 0.5-10% by weight based on the ink composition. The auxiliary separating agent facilitates, in particular, the initial erasability of the writing, that is, the writing containing the auxiliary separating agent as well as the novel separating agent of the invention has an improved erasability immediately after the writing is applied on the writing surface.

The erasable ink composition of the invention may contain a surfactant to facilitate the erasing effect of the aforesaid fatty acid ester of trimethylolalkane to separate a writing from the writing surface. The surfactants used are, for example, anionic surfactants such as a sodium dialkylsulfosuccinate, an alkylsulfate, a polyoxyethyleneglycol alkylphosphate and a polyoxyethyleneglycol alkylsulfate, cationic surfactants such as an alkyltrimethylammonium chloride, an alkyldimethylbenzylammonium chloride, an alkylamine salt and an alkylamide salt, and non-ionic surfactants such as a polyethyleneglycol alkylether, a polyethyleneglycol alkylphenylether, a polyethyleneglycol fatty acid ester and a sorbitan fatty acid ester.

The surfactant may be contained in amounts of up to about 10% by weight, preferably about 0.5-8% by weight, based on the ink composition, however, the total amount of the surfactant and the fatty acid ester of trimethylolalkane must not be more than about 30% by weight. Preferably the total amount is not more than about 20% by weight, since the incorporation of too large an amount of the surfactant and the ester into the ink composition may make it too viscous and make the formed writing viscous, that is, the ink composition may provide a writing which doesn't dry quickly on the writing surface.

The erasable ink composition of the invention may be prepared by any method heretofore known in the art for an ink composition for marking pens. As an example, a production method is described where an oil-soluble or a spirit-soluble dye is used as a colorant. The dye is added to an organic solvent together with a resin, and the resulting mixture is heated to temperatures of about 50°–60° C. with stirring for about 1 hour to provide a uniform solution. To the solution is added the fatty acid ester of trimethylolalkane with a surfactant and an auxiliary separating agent when desired, and the mixture is stirred for another 1 hour at temperatures of about 50°–60° C. to provide the erasable ink composition of the invention.

When a pigment is used as a colorant, however, the preferable method may be as follows. A resin is first added to the solvent, and the mixture is heated to temperatures of about 50°–60° C. with stirring for about 1 hour to provide a uniform solution. To the solution is added the pigment with a disperser if desired, and then the fatty acid ester of trimethylolalkane with a surfactant and an auxiliary separating agent when desired. The resultant mixture is further stirred for another 1 hour at temperatures of about 50°–60° C. to provide the erasable ink composition of the invention. However, these methods are for illustrative purposes only, and are not to be construed to limit the scope of the invention.

The present invention will be more clearly understood with reference to the following examples, in which amounts of ingredients used are expressed by % by weight, and a general method of preparing the ink composition is as follows:

A colorant and a resin were added to an organic solvent, followed by stirring the resultant mixture for about 1 hour at temperatures of 50°–60° C. to provide a uniform mixture. To this mixture was then added the fatty acid ester of trimethylolalkane together with other additives, e.g., a surfactant or an auxiliary separating agent, when desired, and the mixture was stirred for another 1 hour at the same temperature as above, and then was allowed to stand at room temperature.

Each of the ink compositions thus prepared was then charged in an ink chamber in a holder of a marking pen which has a felt-tip at the end of the holder. The ink composition was applied on a writing surface composed of enamel, and then the writing was allowed to stand at temperatures of 50° C. and under a relative humidity of 60%. After one month, the writing on the enamel was wiped with a conventional blackboard eraser, and the resultant stain on the writing surface was observed to determine the ease with which the writing was erased, namely the erasability of the writing.

The erasability of the writing is shown below by marks A, B, C or D, wherein A means that the writing was perfectly erased by wiping with the same ease as the writing immediately after the ink composition was applied on the white board, B means that the writing was perfectly erased, however, with somewhat more intense wiping, C means that the writing was imperfectly erased with an intense wiping to leave stains on the white board, and D means that the writing was imperfectly erased by an intense wiping to leave apparent stains on the white board.

For comparison, ink compositions were prepared which contained no trimethylolalkane ester as a separating agent, and the erasability of the marking formed therewith on the enamel surface was estimated in the same manner as above.

EXAMPLE 1

| Colorant | Carbon black (C.I. 77266) | 3.0 |
|---|---|---|
| Resin | Vinylite YVHH[1] | 5.0 |
| Solvent | Methyl isobutyl ketone | 62.0 |
| | n-Butyl acetate | 20.0 |
| Separating agent | Unister H334R[2] | 10.0 |
| Erasability | A | |

EXAMPLE 2

| Colorant | Fuji IK Blue 2B (C.I. 69825)[3] | 6.0 |
|---|---|---|
| Solvent | Methyl ethyl ketone | 80.0 |
| Separating agent | Unister H310[4] | 14.0 |
| Erasability | A | |

EXAMPLE 3

| Colorant | Permanent Red F4R (C.I. 12335)[5] | 3.0 |
|---|---|---|
| Resin | Vinylite YVHH | 4.0 |
| Solvent | Methyl isobutyl ketone | 6.0 |
| | Methyl ethyl ketone | 52.0 |
| | Ethyl acetate | 25.0 |
| Separating agent | Unister H310 | 9.0 |
| Auxiliary | Liquid paraffin | 1.0 |
| Erasability | A | |

EXAMPLE 4

| Colorant | Cyanine Blue (C.I. 74160) | 4.0 |
|---|---|---|
| Resin | Denka Butyral 2000L[6] | 4.0 |
| Solvent | Ethanol | 62.0 |
| | Isopropanol | 15.0 |
| Separating agent | Unister H334R | 2.0 |
| | Unister H312R[7] | 5.0 |
| Surfactant | Solgen 30[8] | 8.0 |
| Erasability | A | |

EXAMPLE 5

| Colorant | Fuji AS Green 2G (C.I. 74260)[9] | 8.0 |
|---|---|---|
| Solvent | Ethanol | 58.5 |
| | Isopropanol | 16.0 |
| | n-Butanol | 8.0 |
| Separating agent | Unister H334R | 8.0 |
| Surfactant | Plysurf A212C[10] | 1.5 |
| Erasability | A | |

EXAMPLE 6

| Colorant | Michrolith Black C-A (C.I. 77266)[11] | 7.0 |
|---|---|---|
| Solvent | Ethanol | 73.0 |
| | Ethylcellosolve | 5.5 |
| Separating agent | NJLUB TPO[12] | 5.0 |
| | Unister H312R | 5.0 |
| Surfactant | Noigen ET-80[13] | 4.2 |
| | Softer 1000[14] | 0.3 |
| Erasability | B | |

EXAMPLE 7

| Colorant | Fuji IK Black[15] | 8.0 |
|---|---|---|
| Solvent | Methyl isobutyl ketone | 83.0 |
| Separating agent | Unister H334R | 6.0 |

-continued

| | | |
|---|---|---|
| Auxiliary | n-Butyl stearate | 3.0 |
| Erasability | A | |

EXAMPLE 8

| | | |
|---|---|---|
| Colorant | Michrolith Black C-A (C.I. 77266) | 7.0 |
| Solvent | Ethanol | 70.0 |
| | Isopropanol | 14.0 |
| Separating agent | Unister H312R | 8.0 |
| Auxiliary | Isopropyl myristate | 1.0 |
| Erasability | A | |

EXAMPLE 9

| | | |
|---|---|---|
| Colorant | Fuji IK Blue 2B | 6.0 |
| Solvent | Methyl isobutyl ketone | 60.0 |
| | Methyl ethyl ketone | 19.0 |
| Separating agent | NJLUB TPO | 10.0 |
| Auxiliary | Dibutyl adipate | 8.0 |
| Erasability | A | |

EXAMPLE 10

| | | |
|---|---|---|
| Colorant | Carbon black (C.I. 77266) | 3.5 |
| Resin | Denka Butyral 2000L | 3.5 |
| Solvent | Ethanol | 79.0 |
| | Methylcellosolve | 3.0 |
| Separating agent | Unister H310 | 9.0 |
| Auxiliary | Dioctyl cebacate | 2.0 |
| Erasability | A | |

EXAMPLE 11

| | | |
|---|---|---|
| Colorant | Permanent Red F4R | 3.5 |
| Resin | Vinylite VYHH | 3.5 |
| Solvent | Methyl ethyl ketone | 70.0 |
| | n-Butyl acetate | 12.5 |
| Separating agent | Unister H334R | 7.0 |
| Auxiliary | Isopropyl palmitate | 2.0 |
| Surfactant | Nonion 0-6[16] | 1.5 |
| Erasability | A | |

EXAMPLE 12

| | | |
|---|---|---|
| Colorant | Fuji AS Green 2G | 8.0 |
| Solvent | Ethanol | 66.0 |
| | Isopropanol | 15.0 |
| Separating agent | Unister H334R | 6.0 |
| Auxiliary | n-Butyl stearate | 3.0 |
| Surfactant | Plysurf A212C | 2.0 |
| Erasability | A | |

COMPARATIVE EXAMPLE 1

| | | |
|---|---|---|
| Colorant | Carbon black (C.I. 77266) | 3.0 |
| Resin | Vinylite VYHH | 5.0 |
| Solvent | Methyl isobutyl ketone | 62.0 |
| | n-Butyl acetate | 20.0 |
| Separating agent | n-Butyl stearate | 10.0 |
| Erasability | C | |

COMPARATIVE EXAMPLE 2

| | | |
|---|---|---|
| Colorant | Permanent Red F4R | 3.0 |
| Resin | Vinylite VYHH | 4.0 |
| Solvent | Methyl isobutyl ketone | 6.0 |
| | Methyl ethyl ketone | 52.0 |
| | Ethyl acetate | 25.0 |
| Separating agent | Octyldodecanol | 9.0 |
| | Liquid paraffin | 1.0 |
| Erasability | C | |

COMPARATIVE EXAMPLE 3

| | | |
|---|---|---|
| Colorant | Cyanine Blue (C.I. 74160) | 4.0 |
| Resin | Denka Butyral 2000L | 4.0 |
| Solvent | Ethanol | 62.0 |
| | Isopropanol | 15.0 |
| Separating agent | Dioctyl phthalate | 7.0 |
| Surfactant | Solgen 30 | 8.0 |
| Erasability | D | |

COMPARATIVE EXAMPLE 4

| | | |
|---|---|---|
| Colorant | Fuji AS Green 2G | 8.0 |
| Solvent | Ethanol | 58.5 |
| | Isopropanol | 16.0 |
| | n-Butanol | 8.0 |
| Separating agent | Liquid paraffin | 8.0 |
| Surfactant | Plysurf A212C | 1.5 |
| Erasability | D | |

COMPARATIVE EXAMPLE 5

| | | |
|---|---|---|
| Colorant | Michrolith Black C-A | 7.0 |
| Solvent | Ethanol | 73.0 |
| | Ethylcellosolve | 5.5 |
| Separating agent | Poethyleneglycol #200[17] | 10.0 |
| Surfactant | Noigen ET-80 | 4.2 |
| | Softer 1000 | 0.3 |
| Erasability | D | |

NOTES (1) Vinyl chloride-vinyl acetate copolymer by Union Carbide
(2) Trimethylolpropane laurate stearate triester by Nippon Yushi K.K.
(3) Vinyl chloride-vinyl acetate copolymer resin-processed pigment by Fuji Shikiso K.K.
(4) Trimethylolpropane tricaprate by Nippon Yushi K.K.
(5) By Imperial Chemistry Industries
(6) Polyvinyl butyral resin by Denki Kagaku Kogyo K.K.
(7) Trimethylolpropane trilaurate by Nippon Yushi K.K.
(8) Sorbitan fatty acid ester by Dai-Ichi Kogyo Seiyaku K.K.
(9) Polyvinyl butyral resin-processed pigment by Fuji Shikiso K.K.
(10) Polyoxyethylene alkylether phosphate by Dai-Ichi Kogyo Seiyaku K.K.
(11) Cellulose resin-processed pigment by Ciba-Geigy
(12) Trimethylolpropane tricaprylate by Shin-Nihon Rika K.K.

(13) Polyethyleneglycol oleylether by Nippon Yushi K.K.
(14) Derivative of alkylamideamine by Nippon Yushi K.K.
(15) Vinyl chloride-vinyl acetate copolymer resin-processed pigment by Fuji Shikiso K.K.
(16) Nonionic surfactant, polyethylene glycol oleic acid ester by Nippon Yushi K.K.
(17) Average molecular weight of about 200

What is claimed is:

1. An erasable ink composition for writing on an impervious writing surface to form thereon a writing or marking which is erasable by wiping the surface; the composition consisting of:
   about 40-90% by weight of a volatile organic solvent;
   about 1-20% by weight of a colorant;
   about 0.5-30% by weight of a resin which is soluble in the organic solvent;
   about 0-10% by weight of a surfactant;
   about 0-12% by weight of an auxiliary separating agent;
   about 1-25% by weight of a fatty acid ester of trimethylolalkane of the general formula $$R^1-\underset{\underset{CH_2OCOR^4}{|}}{\overset{\overset{CH_2OCOR^2}{|}}{C}}-CH_2OCOR^3$$

wherein $R^1$ represents an alkyl of 1-3 carbons, $R^2$ and $R^3$ represent independently hydrogen or an alkyl of 1-21 carbons, and $R^4$ represents an alkyl of 3-21 carbons.

2. The erasable ink composition as claimed in claim 1 which further includes a surfactant in an amount of up to about 10% by weight based on the ink composition.

3. The erasable ink composition as claimed in claim 1 which further includes at least one auxiliary separating agent in an amount of up to about 12% by weight based on the ink composition, the auxiliary separating agent being selected from the group consisting of
   (a) a higher fatty acid ester of the general formula $$R^5COOR^6 \qquad (II)$$

wherein $R^5$ represents an alkyl of 7-21 carbons and $R^6$ represents an alkyl of 1-18 carbons, and
   (b) an aliphatic dibasic acid diester of the the general formula $$R^7OCO(CH_2)_nCOOR^8 \qquad (III)$$

wherein $R^7$ and $R^8$ represent independently an alkyl of 1-21 carbons, and n is 4-12.

4. The erasable ink composition as claimed in claim 3 which further includes a surfactant in an amount of up to about 10% by weight based on the ink composition.

5. The erasable ink composition as claimed in claim 3 which comprises:
   about 60-85% by weight of the volatile organic solvent;
   about 3-15% by weight of the colorant;
   about 1-20% by weight of the resin; and
   about 3-15% by weight of the fatty acid ester of trimethylolalkane.

6. The erasable ink composition as claimed in claim 5 which further includes a surfactant in an amount of about 0.5-8% by weight based on the ink composition.

7. The erasable ink composition as claimed in claim 5 which further includes at least one auxiliary separating agent in an amount of about 0.5-10% by weight based on the ink composition, the auxiliary separating agent being selected from the group consisting of
   (a) a higher fatty acid ester of the general formula $$R^5COOR^6 \qquad (II)$$

wherein $R^5$ represents an alkyl of 7-21 carbons and $R^6$ represents an alkyl of 1-18 carbons, and
   (b) an aliphatic dibasic acid diester of the the general formula $$R^7OCO(CH_2)_nCOOR^8 \qquad (III)$$

wherein $R^7$ and $R^8$ represent independently an alkyl of 1-21 carbons, and n is 4-12.

8. The erasable ink composition as claimed in claim 7 which further includes a surfactant in an amount of in an amount of about 0.5-8% by weight based on the ink composition.

9. The erasable ink composition as claimed in claim 5 wherein the fatty acid ester of trimethylolalkane is a trimethylolpropane fatty acid triester.

10. The erasable ink composition according to claim 1 wherein the volatile organic solvent is selected from the group consisting of aromatic and alicyclic hydrocarbons, alkyl and alicyclic ketones, aliphatic alcohol esters of lower fatty acids, aliphatic and alicyclic alcohols and glycol monoalkylethers.

11. The erasable ink composition according to claim 10 wherein the colorant is selected from the group consisting of dyes and pigments.

* * * * *